(12) United States Patent
Fong

(10) Patent No.: US 6,493,771 B1
(45) Date of Patent: Dec. 10, 2002

(54) METHOD OF SHARING A COMMUNICATION PORT

(75) Inventor: Chee Keat Fong, Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/470,376

(22) Filed: Dec. 22, 1999

(51) Int. Cl.⁷ ............................ G06F 13/20; G06F 13/36
(52) U.S. Cl. ............................ 710/15; 710/16; 710/18; 710/36; 710/107; 709/303; 379/93.01
(58) Field of Search ............................ 710/15, 16, 18, 710/36, 107; 709/303; 379/93.01

(56) References Cited

U.S. PATENT DOCUMENTS

| 5,721,779 | A | * | 2/1998 | Funk | 380/30 |
| 5,819,112 | A | * | 10/1998 | Kusters | 710/107 |
| 6,006,295 | A | * | 12/1999 | Jones et al. | 340/2.8 |
| 6,101,544 | A | * | 8/2000 | Beebe et al. | 709/229 |
| 6,279,041 | B1 | * | 8/2001 | Baber et al. | 370/235 |
| 6,279,054 | B1 | * | 8/2001 | Boyle | 379/220.01 |

* cited by examiner

*Primary Examiner*—Jeffrey Gaffin
*Assistant Examiner*—Rehana Perveen

(57) ABSTRACT

A method for controlling a communication port of a computer by an application running on the computer is disclosed. The application interfaces with an external device through a cable connected to the communication port. While interfacing with the external device, the application looks for an identification signal on the communication port. When the identification signal is detected, the application relinquishes control of the communication port so that another application can use the communication port. Such a method does not require user intervention when switching between the applications using the communication port.

15 Claims, 1 Drawing Sheet

METHOD OF SHARING A COMMUNICATION PORT

FIELD OF INVENTION

This invention relates to a method of sharing a communication port between two applications. More particularly, this invention relates to a method of automatically relinquishing control of a serial communication port by an application so as to allow another application to have control over it.

BACKGROUND

Handheld personal computers (H/PC) have become very popular as personal organizers. These H/PCs are generally small and light, making them very handy for a mobile user. One of the applications on such H/PCs is the appointment application. This appointment application allows a user to enter and maintain information regarding meetings and things to do. Such information requires constant updating throughout the day. The information is usually entered using a keyboard on a H/PC. Although such a keyboard is adequate for entering small amount of data, it is an impediment to the quick entry of large amounts of data. The small size QWERTY keyboard on such a H/PC does not allow typical typing speeds achievable on a standard size QWERTY keyboard. As such, to ease the entry of large amount of data, the manufacturers of such a H/PC device usually provide an accompanying appointment application that runs on a desktop personal computer (PC). The standard size keyboard on the desktop PC then allows quick entry of data. Once the data is entered, the data can be downloaded onto the H/PC. Such a process is known as synchronization. To allow synchronization, the H/PC is connected via its serial communication port to the desktop PC by a synchronization cable. Software on both the H/PC and desktop PC communicate via the synchronization cable to synchronize data on both ends. After synchronization, the same data is maintained on both the desktop PC and the H/PC. Other data which can be easily entered on the desktop PC such as a word processing document can also be downloaded onto the H/PC through this synchronization cable. A user typically carries out such a synchronization process several times a day. Due to the relatively small size and cost constraint of a H/PC, usually only a single serial communication port is made available on the H/PC. This serial communication port which can also be used for communicating with other external devices will have to be shared. As such, when switching between using the serial port for communication with an external device and using the port for synchronization, a user would have to perform extraneous steps to facilitate such switching. The user would have to disconnect the external device and connect the synchronization cable to the serial communication port of the H/PC. The user will also have to cause the application using the external device to relinquish control of the serial communication port to allow a synchronization software on the H/PC to acquire control of the serial communication port. The user performs such a step by either manually activating a suitable command in the application or manually shutting down the application entirely. Similarly, when synchronization is complete, the user will have to reconnect the external device and manually cause the associated application to acquire control of the serial communication port once again to resume use of the port to communicate with the external device. For a user who needs to perform synchronization regularly, such manual steps are cumbersome.

From the foregoing, the prior art therefore has a need for a method of automatically allowing the application software to relinquish and reacquire control of a serial communication port when switching between using an application for communicating with an external device and performing synchronization.

SUMMARY

In accordance with a preferred embodiment, the present invention provides a method for controlling a communication port of a computer by a first application running on the computer. The method involves the first application acquiring control of the communication port. Thereafter, the first application uses a first cable connected to the communication port for interfacing with an external device. While interfacing with the external device, the first application looks for an identification signal on the communication port. The first application relinquishes control of the communication port when the identification signal is detected so that a second application can use the communication port.

Preferably, the first application also looks for the removal of the identification signal on the communication port. When this condition occurs, the first application can resume control and use of the communication port to continue interfacing with the external device.

BRIEF DESCRIPTION OF DRAWINGS

The invention will be better understood with reference to the following drawing, in which.

DETAILED DESCRIPTION OF THE PREFERRED EMBODIMENT

Figure 1:
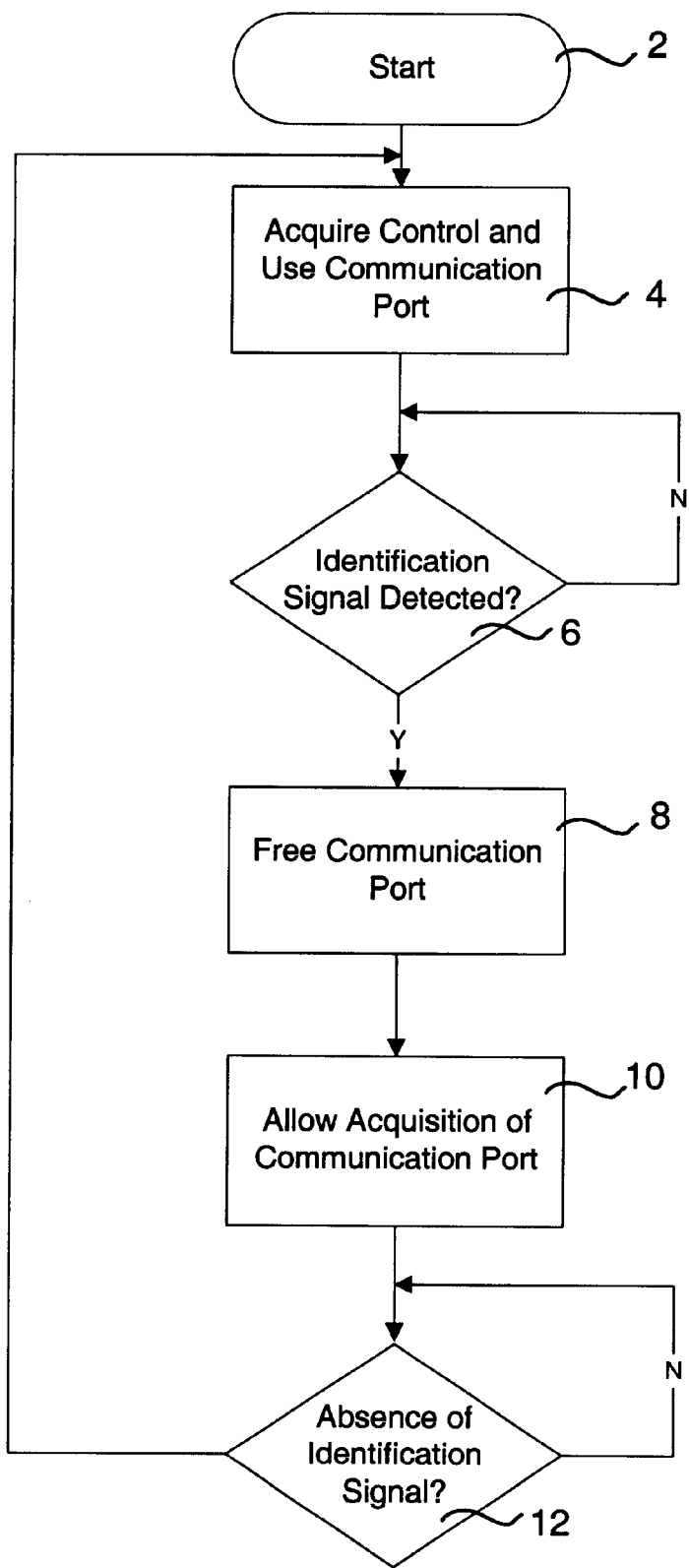
FIG. 1 is a flowchart showing a sequence of steps according to a preferred embodiment of the present invention for automatically relinquishing control of a serial communication port by an application so as to allow another application to have control over it.

Hereafter, a preferred embodiment of the present invention will be described in the context of a RS 232C serial communication port on a handheld personal computer (H/PC). However, it is to be understood that the invention is equally applicable to other types of communication ports on other devices such as a desktop personal computer or a notebook computer.

According to the preferred embodiment, a single serial communication port on the H/PC can be shared between applications running on the H/PC. This sharing of the serial communication port can be carried out without having to manually switch control of the serial communication port. An example of an application is a synchronization application which allows data on a desktop PC and the H/PC to be synchronized. Such a synchronization process requires that the H/PC be connected via the serial communication port to the desktop PC using a synchronization cable. Another example of an application is one that is able to exchange data with an external keyboard. The external keyboard is connected to the H/PC via the same serial communication port using a second cable. This second cable is usually integral with the keyboard. When the user wishes to perform synchronization while connected to the external keyboard, the user will have to disconnect the second cable and connect the synchronization cable to the serial communication port. According to the present invention, no extra steps over what is described will be required for synchronization to proceed. The application responsible for exchanging data with the keyboard is able to recognize that the synchronization cable is connected and thus to free or relinquish control of the serial communication port. This freeing of the serial communication port allows the synchronization software to acquire control of the freed serial communication port and to start using it.

The interconnections of the lines in the serial communication port are well known to those skilled in the art. In this preferred embodiment, the synchronization cable is given an identity which is recognizable by applications which use the serial communication port. This identity takes the form of an asserted Data Terminal Ready (DTR) line from the desktop PC which is connected to a Data Carrier Detect (DCD) line of the serial communication port on the H/PC. All other external devices keep their DTR line in an unasserted state. Upon detection of the asserted state on the DCD line, an application will relinquish control of the serial port as described above. Similarly, when the synchronization cable is disconnected, the keyboard application is able to detect such a condition and to acquire control of the serial communication port to resume usage of it. This preferred embodiment of the present invention is contingent on the synchronization software relinquishing control of the serial communication port for the invention to work. This relinquishing control of the serial communication port occurs either when synchronization is complete or when the synchronization cable is disconnected.

The details of the present invention according to the preferred embodiment are now described with the aid of FIG. 1. FIG. 1 is a flowchart showing a sequence of steps in an application software, such as the keyboard application described above. This application will hereafter be referred to as the keyboard application. The sequence starts in a START step 2, where the keyboard application is started. This keyboard application runs on a handheld personal computer (H/PC) for interfacing with an external QWERTY keyboard. The QWERTY keyboard is connected to the H/PC via a serial communication port on the H/PC. The sequence next proceeds to an ACQUIRE CONTROL AND USE COMMUNICATION PORT step 4. In this step 4, the keyboard application attempts to open or acquire control of the communication port, preferably using an applications programming interface (API) call. If the serial communication port is free, such an API call will be successful and the keyboard application will be granted control of the serial communication port. Thereafter, the keyboard application can use the serial communication port to interface with the external keyboard using an appropriate communication protocol. During such a connection, the DCD line is kept in an unasserted state by pulling the line to an appropriate level.

While communicating with the external keyboard, the keyboard application also looks for an asserted signal on the DCD line of the serial communication port in an IDENTIFICATION SIGNAL DETECTED? step 6. In this preferred embodiment, this DCD signal is used for the purpose of identifying a serial connection for synchronization of data between the H/PC and a desktop PC. The DCD line is a line that is normally used by a modem to indicate to a computer that a carrier is detected on a telephone line. Any other unused line in the serial communication port can be used for such an identification purpose. Also applicable may be a cable specially built to carry such an identification signal. If no identification signal is detected in the IDENTIFICATION SIGNAL DETECTED? step 6, the sequence loops around this step 6. This looping around a step may be implemented as polling or as an interrupt. If an identification signal is detected according to the step 6, the sequence proceeds to a FREE COMMUNICATION PORT step 8. In this step, the keyboard application frees or relinquishes control of the serial communication port, preferably using another suitable API call.

Next the sequence proceeds to an ALLOW ACQUISITION OF COMMUNICATION PORT step 10, where the keyboard application can perform one of several steps to allow the acquisition of the serial communication port by another application such as one for synchronization of data between the H/PC and a desktop PC. This other application will hereafter be referred to as the synchronization software. One possibility is for the keyboard application to invoke the synchronization application to allow it to run and acquire control of the serial communication port. Another possibility is for the keyboard application to send a signal via interprocess communication methods such as by message passing or by semaphones to the synchronization application to alert the synchronization software of the freed state of the serial communication port. Yet another possibility is for the keyboard application to do nothing and allow the synchronization application to poll an appropriate status register for the availability of the serial communication port. What is important here is that once the identification signal on the serial port is detected as belonging to the synchronization application, the keyboard application is able to relinquish control of the serial communication port so that the synchronization application can use it.

While the control of the serial communication port is being used by the synchronization application, the sequence proceeds to an ABSENCE OF IDENTIFICATION SIGNAL? step 12. In this step 12, the keyboard application waits for the synchronization application to stop running. The synchronization application frees the serial communication port when it stops running. To know whether the serial communication port is free, the keyboard application attempts to acquire the serial communication port at predetermined regular intervals. An attempt will be successful only if the serial communication port is free. Thereafter, the keyboard application looks for the signal on the DCD line of the serial communication port. The keyboard application looks for a different signal in this step 12. Earlier, the keyboard application monitors for an asserted state of the DCD line. In this step 12, the keyboard application monitors for a deasserted state. If the DCD line remains asserted, indicating that the synchronization cable is still connected to the serial communication port, the sequence loops around this step 12. If however, the DCD line is detected to be absent or deasserted, the keyboard application can assume that the synchronization cable has been disconnected from the serial communication port and can proceed to reestablish connection with the earlier connected external keyboard. In such a case, the sequence returns to the ACQUIRE CONTROL AND USE COMMUNICATION PORT step 4. In this step 4, the keyboard application is once again able to control and use the serial communication port. The successful operation of this step 4 is dependent on the relinquishing of control of the serial communication port by the synchronization application, as described earlier. The keyboard application while using the serial communication port will continue to look for change of status on the DCD line.

I claim:

1. A method of controlling a communication port of a computer by a first application running on the computer, the method comprising:

acquiring control of the communication port by the first application;

interfacing the acquired communication port with an external device by using a first cable;

monitoring the acquired communication port by the first application for an identification signal associated with a second application; and relinquishing control of the communication port by the first application when the identification signal is detected; and transferring control of the communication port to the second application.

2. The method according to claim 1, further comprising:

monitoring the communication port by the first application for absence of the identification signal on the communication port while the second application has control of the communication port; and reacquiring control of the communication port to continue interfacing with the external device when absence of the identification signal is detected.

3. The method according to claim 1, wherein the identification signal on the communication port includes an asserted state of a line of the communication port.

4. The method according to claim 3, wherein the communication port is a serial communication port and the line includes a Data Carrier Detect line of the serial communication port.

5. The method according to claim 4, wherein the identification signal is provided by a signal on a second cable which is connected to the serial communication port.

6. The method according to claim 5, wherein the second application is a synchronization application and the second cable is connected to another computer running an associated synchronization application.

7. A program storage device readable by a computing device, tangibly embodying a program of instructions, executable by the computing device to perform the method for controlling a communication port of a computer by a first application running on the computer, the method comprising:

acquiring control of the communication port by the first application;

interfacing the acquired communication port with an external device by using a first cable;

monitoring the acquired communication port by the first application for an identification signal associated with a second; and relinquishing control of the communication port by the first application when the identification signal is detected; and transferring control of the communication port to the second application.

8. The program storage device according to claim 7, further comprising:

monitoring the communication port by the first application for absence of the identification signal on the communication port while the second application has control of the communication port; and reacquiring control of the communication port to continue interfacing with the external device when absence of the identification signal is detected.

9. A method of sharing a communication port of a computer between a first application and a second application running on the computer, the method comprising:

allowing the first application to acquire control of the communication port for interfacing the communication port with an external device using a first cable;

monitoring the communication port for an identification signal associated with a second application while the first application has control of the communication port; and transferring control of the communication port from the first application to the second application when the identification signal is detected.

10. A method according to claim 9, wherein monitoring the communication port for an identification signal includes monitoring the communication port by the first application for an identification signal associated with a second application while the first application has control of the communication port.

11. A method according to claim 9 further comprising:

monitoring the communication port for absence of the identification signal associated with the second application while the second application has control of the communication port; and allowing the first application to regain control of the communication port when absence of the identification signal is detected.

12. A method according to claim 11, wherein monitoring the communication port for absence of the identification signal includes monitoring the communication port by the first application for absence of the identification signal associated with the second application while the second application has control of the communication port.

13. A method of sharing a communication port of a computer comprising:

acquiring control of the communication port by a first application for interfacing the communication port with an external device connected to the communication port using a first cable;

monitoring the communication port by the first application for an identification signal associated with a second application while the first application has control of the communication port, the identification signal being from a second cable that is connected to the communication port after the first cable is removed;

relinquishing control of the communication port by the first application when the identification signal is detected; and transferring control of the communication port from the first application to the second application.

14. A method according to claim 13, further comprising:

regaining control of the communication port by the first application when the second cable is disconnected from the communication port.

15. A method according to claim 14, further comprising:

monitoring the communication port by the first application for absence of the identification signal while the second application has control of the communication port before regaining control of the communication port by the first application.

* * * * *